Patented June 8, 1943

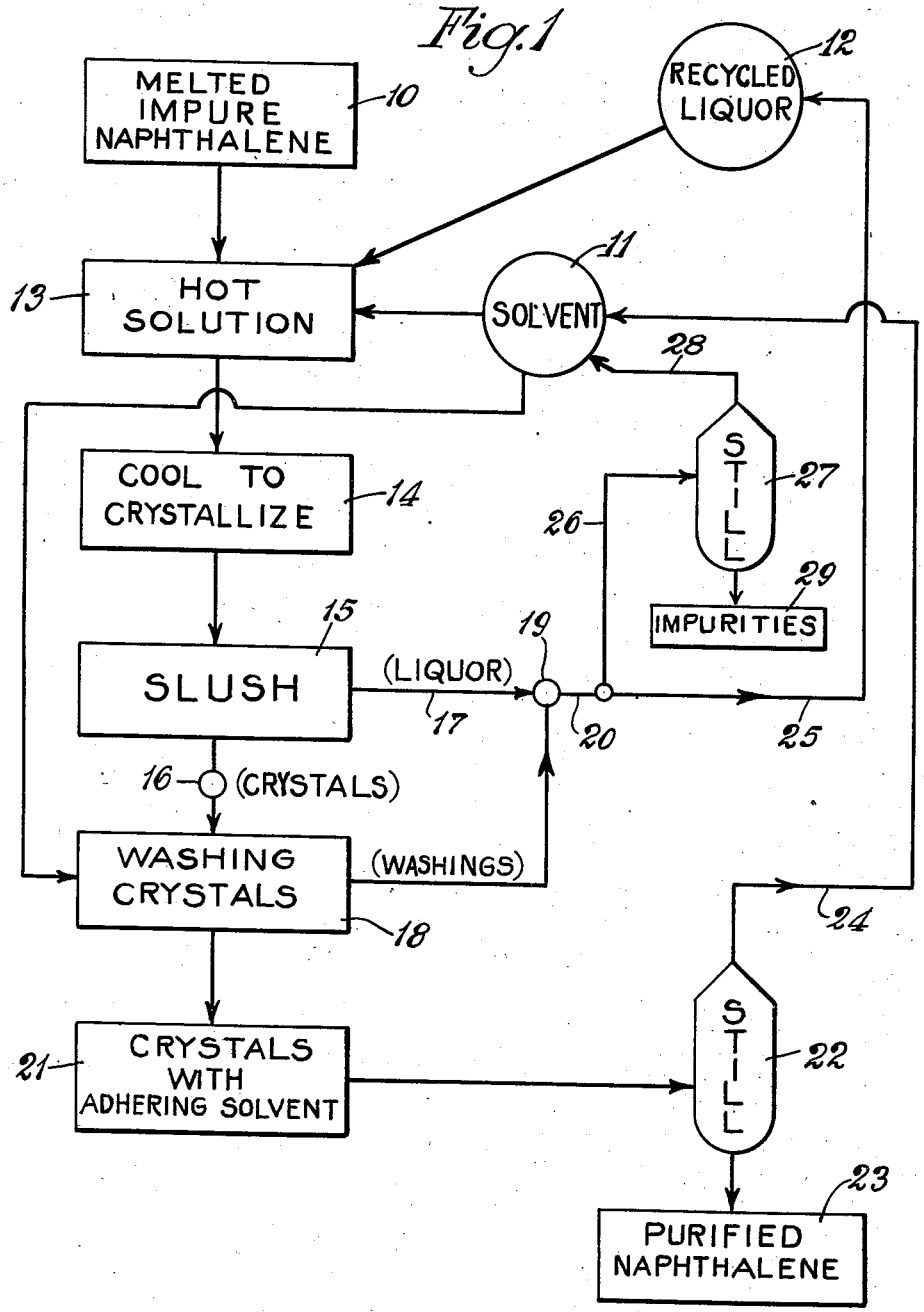

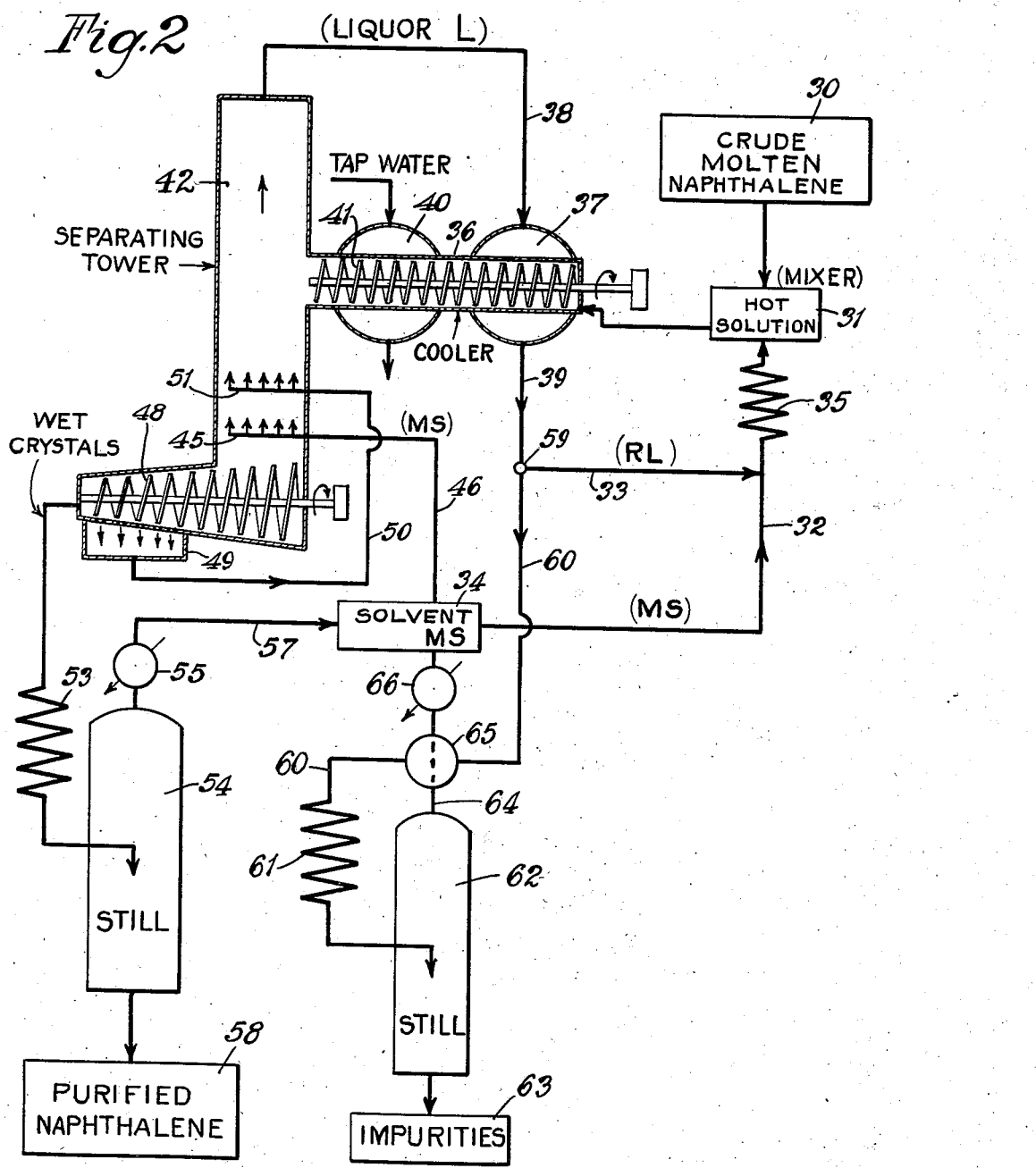

2,321,117

UNITED STATES PATENT OFFICE 2,321,117

PURIFICATION OF NAPHTHALENE

Donald F. Wilcock, Chicago, Ill., assignor to The Sherwin-Williams Company, Cleveland, Ohio, a corporation of Ohio Application May 15, 1942, Serial No. 443,162

9 Claims. (Cl. 260—674)

The present invention relates to the purification of crude naphthalene to provide a naphthalene of higher melting point suitable for use in numerous chemical processes.

In many uses of naphthalene a commercial crude product is unsatisfactory or undesirable, and it is necessary to refine it further, as to a point where it exhibits a solidification point (S. P.) of 79.8° C., has a wash test of 4 to 5 (discussed hereinafter) and an amber color when molten. Certain available crude naphthalenes having for example a solidification point of 78° C. or lower, do not meet these requirements. These and other crudes may be refined by the present invention. Heretofore, refinement has been effected commercially by washing procedures, variously employing alkali solutions, acid solutions, and water, with or without a distillation step. One method is disclosed in U. S. patent to Todd and Owens No. 1,996,262. Well known theoretical or laboratory procedures involve recrystallization from numerous solvents. Naphthalene has a solubility in many varieties of solvent substances such that it may be purified by a recrystallization operation.

However, such processes are expensive in that there is the necessity to redistill solvent for reuse of it in the process. The selection of a solvent for a commercial process depends in part upon the yield of purified material in proportion to the amount of solvent used, and also in proportion to the amount of solvent to be redistilled for continued efficient practice. Where the solvent material is a mixed one the question of distillation involves the problem of maintaining a fixed composition of the solvent mixture so that the process operates in the same way from time to time. Also where the solvent is a mixed solvent, it must be one which maintains a single liquid phase throughout the range of temperatures encountered in the process of purifying the naphthalene.

Another practical consideration is the selection of a solvent which has a relatively low boiling point, that is one such that the heating of it before cooling will not involve too expensive heating equipment or costs for heat. Likewise, one should be selected such that the cooling operation is not expensive.

The purpose of the present invention is to recrystallize naphthalene from a solvent material meeting all of these requirements, and in addition permitting a portion of the mother liquor to be recycled in the process when admixed with an additional amount of fresh or redistilled solvent material.

A particular object of the invention is to use as a solvent material, azeotropic mixtures of water and alcohols of the group consisting of ethyl, n-propyl, isopropyl, secondary-butyl and tertiary-butyl alcohols.

In carrying out the invention numerous mechanical advantages result as will become apparent hereinafter. First, however, the general procedure will be described without reference to unnecessary mechanical detail and without reference to any particular one of the solvents. The invention is explained with reference to the accompanying drawings in which:

Fig. 1 is a diagrammatic arrangement of the steps of the process generally.

Fig. 2 is a diagrammatic arrangement of apparatus for conducting the process in a continuous manner.

It is to be understood that the invention and the apparatus are not in any way limited to or by the drawings, short of its scope as expressed in the appended claims.

In Fig. 1, the numeral 10 represents naphthalene to be purified. Preferably it is in a molten condition, because mixing the melted material with liquid solvent is easier than dissolving the crystals in hot solvent. The temperature of the melted naphthalene can be such in comparison with the temperature of the solvent to be used, that the resulting mixture is a homogeneous solution not too much higher in temperature than the point where crystallization begins on cooling.

Numeral 11 represents a supply of fresh or redistilled solvent material. Numeral 12 represents a supply of the same solvent material containing impurities of the naphthalene, and it may be considered as being a portion of the mother liquor derived from the process being described. Liquor 12 and a portion of fresh liquor 11 are combined with melted naphthalene 10, to produce a heated solution 13 to be cooled to throw out naphthalene.

The numeral 14 represents a cooling of the solution to provide a slush 15 comprising purer crystals of naphthalene, and solvent liquor containing impurities derived from the naphthalene 10. Suitable separation of the slush 15 into crystals 16 and liquor 17 is effected accompanied or followed by washing the crystals at 18 to remove adhering solvent liquor with a small amount of fresh solvent 11, the washings being added at 19 to the said solvent liquor 17 in dilution thereof. The diluted solvent liquor is represented by line 20 and the washed crystals with adhering fresh solvent 11 are represented by numeral 21. The crystals 21 are melted in still 22, which discharges as a melt, purified naphthalene 23, and solvent vapor, which in condensed form on line 24 of the drawing is returned to supply 11.

The diluted solvent liquor 20 is divided into two portions 25 and 26. The portion 25 provides supply 12. The portion 26 is distilled in still 27 to recover and condense the solvent. The recovered solvent 28 is added to the supply 11. The residue 29 from still 27 is the impurities removed from the crude naphthalene 10 in the purification process.

From the foregoing it is seen that the melted naphthalene is dissolved in a mixture comprising recycled liquor 12, the original supply of solvent 11, the recovered solvent 24, and the recovered solvent 28. It is important that these constituents be always of the same constitution. With a single solvent ingredient, as differentiated from a solvent mixture, this is readily effected. But with a solvent mixture it is not readily effected, except in the special circumstances hereinafter described.

Investigations have shown that the addition of water to pure single solvents which are miscible with water decreases the solvent power for naphthalene. This is desirable for high yield on cooling, so that too much naphthalene is not recycled with the recycled liquor 12. Consequently, the present invention employs alcohols which are miscible with water to provide a solvent mixture which remains as a single phase in change of temperature from the mass 13 to the mass 15. Various mixtures of water and an alcohol will satisfy these conditions, but some of them will yield in stills 22 and 27 a distillate which is too low in alcohol content, and others will yield a distillate which is too high in alcohol content, compared to the mixture employed from the step 13 to the step 18, and available in supply 12. Thus, in such cases the supplies 11 and 12 will not be identical in proportion of water to alcohol. According to the present invention, the stills 22 and 27 are operated at the same pressure, and the alcohol-water mixture used as the solvent material is the one which distills at that pressure without change of composition.

Such a mixture is known as a constant-boiling mixture or as an azeotropic mixture, it being understood that these terms comprehend some specified total vapor pressure. The preferred pressure for the invention is atmospheric pressure, whether it be at sea level or at elevated altitudes, or whether it change slightly with weather conditions at any given location. Thus, the process conducted at atmospheric pressure at sea level may employ an azeotropic mixture which is different from another azeotropic mixture employed in a process at atmospheric pressure in some mountainous location.

Numerous alcohols have been examined and found deficient in one or more respects. Methyl alcohol does not form an azeotropic mixture at 760 mm. N-butyl alcohol and isobutyl alcohols are not miscible with water in all proportions at ordinary room temperatures, and the azeotropic mixtures with water at one atmosphere pressure, separate into two liquid phases at the chill temperatures, which are room temperature or lower, to which they may be subjected in the process. Secondary butyl alcohol as an azeotropic mixture with water at 32% by weight at 760 mm. pressure on cooling remains single phase until $-3°$ C. is attained, when ice crystals begin to form. It may be used in the present invention where the chilling process is carried out as recommended, in operating at 760 mm. pressure or thereabouts. This temperature will change with the pressure. Thus, the secondary butyl alcohol may be a border-line alcohol for the invention and may or may not be used according to the operating pressure and the choice of the chill temperature. Among the various alcohols the azeotropic mixtures with water and the alcohols: ethyl, n-propyl, isopropyl, secondary-butyl and tertiary-butyl, have a suitably low capacity for dissolving naphthalene at the cold temperatures described, to permit high recovery of naphthalene in the process, without the necessity to recirculate large dissolved quantities of naphthalene in the undistilled recycled portion of the mother liquor. Another advantage of the azeotropic mixtures of these alcohols with water at normal pressure of one atmosphere is their low boiling points. These are all close to the melting point of naphthalene, and under the boiling point of 100° C. for water, whereby a low pressure steam may be utilized for heat in the process. Likewise, the cold temperature required may readily be attained with tap water, or by ordinary cooling by room air even to 30° C. in summer, or 20° C. or less in winter.

The following table shows various properties of azeotropic mixtures at 1 atmosphere pressure.

| Alcohol | Mole percent water | Weight percent water | B. P. °C. |
| --- | --- | --- | --- |
| Ethyl | 10.6 | 4.4 | 78.2 |
| N-propyl | 56.8 | 28.2 | 87.7 |
| Isopropyl | 31.5 | 12.1 | 80.4 |
| Secondary-butyl | 66.0 | 32.0 | 88.5 |
| Tertiary-butyl | 35.4 | 11.7 | 79.9 |

In the case of aqueous n-propyl alcohol, the composition of the azeotropic mixture is substantially constant as the pressure changes from 700 to 800 mm.

In the case of aqueous isopropyl alcohol, the composition of the azeotropic mixture changes from about 30 to 33 mole percent water in a change from 700 to 800 mm. pressure.

In the case of aqueous mixtures of ethyl alcohol, the composition of the azeotropic mixture changes from about 4 to 10 mole percent of water in a change from 640 to 800 mm. pressure.

Thus, it will be appreciated that any considerable change of pressure for the stills will alter the composition of the solvent mixture, and hence its solubility characteristics for the process. An atmospheric-pressure operation at sea level may differ considerably from an atmospheric-pressure operation at Denver, Colorado, for example. But this will make no difference in the principles of the process, nor in repeating it at any given location, for any given piece of equipment. The character of the equipment and the manner of using it may effect as much change as does altitude.

This may be readily understood by the following description of a continuous operation of the apparatus shown in Fig. 2.

In Fig. 2 the process generally described in Fig. 1 is carried out in a practical manner. The amounts given are for use of azeotropic mixture of water and isopropyl alcohol, and for operation of the stills at atmospheric pressure of substantially one atmosphere.

Numeral 30 represents a supply of impure naphthalene of 78° C. S. P. in melted condition, which is run at the rate of 5000 lbs. per hour into a mixer 31, into which a solvent mixture is also run, derived from two sources, presently designated by supply lines 32 and 33. The supply 32 is from a "fresh" solvent reservoir 34 in which the liquid is designated MS (mixed solvent). The liquid MS is substantially free from impurities of the naphthalene derived in process, but it may contain some naphthalene, the presence of which could be considered an impurity in the solvent for some other use or process. The liquid MS is supplied to mixer 31 at the rate of 203 gallons per hour.

The liquid from supply 33 is a recycled liquor of the process, and contains solids to an appreciable extent, as well as solvent mixture. It is termed also RL (recycled liquor) and is supplied at the rate of 1330 lbs. of solid and 1150 gallons of solvent mixture, per hour.

A coil 35 is supplied to heat or cool the solvent going to mixer 31 so that as it combines with the melted naphthalene, the temperature of the resulting solution is about 70° C., which is but a few degrees above the temperature at which crystallization begins.

The hot solution is then run continuously into a crystallizer 36 wherein it is cooled. It may be operated as a two-stage cooler, jacket 37 being cooled by returning liquor L in pipe line 38—39, and jacket 40 at the exit end being cooled by tap water. A rotary conveyer 41 urges the resulting slush forward into a settling chamber 42. Crystals tend to settle, and liquor L is drawn off at the top into pipe 38. At the bottom of the lower end, a suitable dispersing means 45 discharges mixed solvent MS leaving reservoir 34 in pipe 46 at the rate of 427 gallons per hour, to wash the settling crystals. The washings move upwardly and combine with the original mother liquor discharged from the crystallizer 36.

The crystals settle into continuous conveyer-device 48 having an expressing action, as a result of which liquid is collected at 49 and carried away in the pipe 50 to distributor 51 in the settling chamber 42 above the distributor 45.

The conveyor 48 discharges a mass of wet crystals of naphthalene which are melted in a suitable device 53, and then introduced into a still 54 operated at a pressure which is atmospheric at approximately sea-level for the details of the procedure being described. In the still the mixed solvent originally adhering to the crystals is vaporized, and when condensed at 55 is led by pipe line 57 to solvent reservoir 34. Approximately 427 gallons per hour are thus returned to the reservoir. It will be appreciated that some naphthalene vapor may also pass out of the still and contaminate the alcohol, but for recycling uses in the process, this is not in fact any disadvantage.

At the bottom of the still melted naphthalene 58 is drawn off at the rate of 4765 lbs. per hour. This is the purified naphthalene sought by the process.

The liquor L in line 38—39, heated when entering pipe 39 by passage through heat-exchanging jacket 37, is split at point 59 into major and minor portions. Major portion passes by pipe 33 as the described liquor RL. The minor portion passes in pipe 60, through a heating coil 61, into still 62, where at atmospheric pressure it is vaporized. The residue in the still is the impurities 63 removed from the naphthalene 58 and it may be drawn from the still at the rate of 235 lbs. per hour. It corresponds to 4.7% impurities in the original naphthalene 10.

From the still 62 the solvent vapors are removed in line 64, cooled or partially condensed in heat exchanger 65, finally condensed in condenser 66, and led to reservoir 34 at the rate of 203 gallons per hour. The heat-exchanger 65 is in series with the heating coil 61 and the line 60.

From the foregoing it will be observed that 1353 gallons per hour of solvent enter the mixer of which only 203 gallons per hour are substantially new, fresh or recovered solvent. This is 15%. It follows, then, that at point 59, the liquor L in line 39 is divided in the proportion of 15 parts and 85 parts.

The percentage of liquor recycled in the practice of the invention is a matter of adjustment and control, according to many factors. The purity of naphthalene supplied and required, the economics, the extent of dilution by washing are all factors affecting the division of the liquor into portions to be recycled and distilled. The proportion is not critical for the invention. Because of the fact that a portion is recycled, the invention requires an azeotropic mixture. The more of liquor L that can be recycled, the lower the cost of operation of the process.

If the apparatus should be changed so that the liquor L is less diluted by the solvent entering it by way of pipes 46 and 50, the recycled proportion should be less than that described to secure a purification of the same order. Other apparatus may be used to separate crystals and liquor, and to wash the crystals, and such a change may materially affect this division of the liquor at point 59.

In the specific example illustrated in Fig. 2, it is to be understood that use of a more crude naphthalene than that described will require that a less proportion of liquor be recycled, to secure the same degree of purity in the product, while using also the same amounts of liquid for the washings of the crystals.

In carrying out the invention the final purity aimed at is of course an arbitrary one. Practically, however, in addition to a high solidification point (S. P.), a standard wash test purity of 4 to 5 is aimed at. The test is sometimes referred to as the Barrett test. It is briefly as follows: Mix 11 cc. of benzol with 7 cc. of molten naphthalene to be tested. The solution is then added to 7 cc. of concentrated (95%) sulfuric acid in a square one-ounce bottle. The mixture is shaken for 5 seconds and then allowed to stand 5 minutes. The color and clarity of the acid layer are compared to a series of standards in similar bottles.

The invention is not limited to use of the particular steps and apparatus described herein by way of illustrating the invention. Numerous modifications and departures are contemplated as falling within the scope of the invention as expressed in the appended claims.

I claim:

1. The method of purifying naphthalene which comprises forming a hot solution of naphthalene in a mixed solvent of water and an alcohol selected from the group consisting of ethyl, n-propyl, isopropyl, secondary-butyl and tertiary-butyl alcohols, said mixed solvent being the azeotropic mixture for the pressure hereinafter recited, cooling the solution to effect formation of crystals of naphthalene in a resulting single-phase liquor in the form of a slush of liquor and crystals, separating crystals and liquor, washing the crystals with said mixed solvent substantially lacking in impurities for naphthalene, combining the washings and said liquor, distilling residual alcohol and water from the washed naphthalene at a chosen pressure at which said mixed solvent is azeotropic to recover the content of said mixed solvent for reuse in the process, whereby the residue of such distillation is purified naphthalene, dividing the said combined liquors into two portions, distilling said one portion at said chosen pressure to recover the content of said mixed solvent for reuse in the process, and mixing the other portion of liquor with a quantity of said mixed solvent which is substantially free from impurities from naphthalene to provide a body of said mixed solvent, and forming a hot solution of naphthalene to be purified in said body in repeating the process herein recited.

2. The process of claim 1 in which the chosen pressure is atmospheric pressure for the locale of the process.

3. The process of claim 1 in which the selected alcohol is isopropyl alcohol.

4. The process of claim 1 in which the chosen pressure is atmospheric pressure for the locale of the process, and in which the selected alcohol is isopropyl alcohol.

5. A continuous process for the purification of naphthalene permitting a substantially closed circuit for materials recycled in the process, which comprises (1) mixing a continuous supply of naphthalene to be purified with a continuous mixed supply of mixed solvent to form a hot solution, said mixed solvent being essentially a mixture of water and an alcohol selected from the group of ethyl, n-propyl, iso-propyl, secondary-butyl and tertiary-butyl alcohols, said mixed solvent being azeotropic at the pressure hereinafter recited, said mixed supply including a portion of combined liquor as hereinafter recited from the supply RL hereinafter recited containing impurities derived in the process from the naphthalene subject to purification by the process and including a portion of said mixed solvent derived from a supply MS hereinafter recited which is substantially free from impurities from said naphthalene; (2) cooling said hot solution to effect formation of crystals of naphthalene in a resulting single-phase liquor in the form of a slush of liquor and crystals; (3) withdrawing said crystals from association with said liquor phase against a washing stream of said mixed solvent derived from said supply MS; (4) combining the resulting washings with said liquor phase to provide a supply L; (5) dividing said supply L into one portion as supply RL above recited and a remaining portion; (6) conveying said remaining portion to a continuous still; (7) distilling mixed solvent from said still at a chosen pressure at which said solvent is azeotropic; (8) condensing the vapors from said still and conducting the resulting liquid to said suply MS, the residue in said still being impurities derived from the naphthalene; (9) conveying the wet washed crystals of naphthalene to a continuous still in melted form; (10) distilling mixed solvent from said still at said chosen pressure; (11) condensing the vapors from said still and conducting the resulting liquid to said supply MS; and (12) withdrawing purified naphthalene from said last mentioned still.

6. The process of claim 5 in which the pressure for operating the stills is atmospheric.

7. The process of claim 5 in which the selected alcohol is isopropyl alcohol.

8. The process of claim 5 in which the pressure for operating the stills is atmospheric and in which the selected alcohol is isopropyl.

9. Apparatus for continuously purifying soluble crystallizable material comprising essentially and in sequence, a mixer in which to form a relatively hot solution of said material in a solvent, a cooler for said solution in which to convert said solution into a solid phase of said material and a single liquor phase, a separator for said two phases, a still for removing residual solvent from the said solid phase, and in further association with said elements, means to divide said liquor phase into two portions, a still in which to recover solvent from one portion, means to lead said other portion to the mixer, means to wash residual liquor from the solid phase with fresh solvent, means to combine the resulting washings with said liquor phase prior to dividing the same into said two portions, a container for a supply of said fresh solvent, means to lead the distillate of said two stills to said container, and means to lead fresh solvent from said container to said mixer for combining fresh solvent with said portion of liquor entering the mixer.

DONALD F. WILCOCK.